(12) United States Patent
Flider

(10) Patent No.: US 9,965,885 B2
(45) Date of Patent: May 8, 2018

(54) OBJECT MATCHING AND ANIMATION IN A PRESENTATION APPLICATION

(71) Applicant: APPLE INC., Cupertino, CA (US)

(72) Inventor: Mark J. Flider, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 483 days.

(21) Appl. No.: 14/057,887

(22) Filed: Oct. 18, 2013

(65) Prior Publication Data

US 2015/0113368 A1  Apr. 23, 2015

(51) Int. Cl.
| | |
|---|---|
| *G06T 13/80* | (2011.01) |
| *G06F 17/22* | (2006.01) |
| *G06K 9/62* | (2006.01) |
| *G06F 17/21* | (2006.01) |

(52) U.S. Cl.
CPC ............ *G06T 13/80* (2013.01); *G06F 17/211* (2013.01); *G06F 17/212* (2013.01); *G06F 17/2264* (2013.01); *G06K 9/6201* (2013.01); *G06K 9/6202* (2013.01); *G06K 9/6203* (2013.01)

(58) Field of Classification Search
CPC .. G06F 17/2264; G06F 17/211; G06F 17/212; G06K 9/6201; G06K 9/6202; G06K 9/6203; G06T 13/80
See application file for complete search history.

(56) References Cited

U.S. PATENT DOCUMENTS

| | | | |
|---|---|---|---|
| 7,721,209 B2* | 5/2010 | Tilton ..................... | G06T 13/80 715/730 |
| 8,134,558 B1 | 3/2012 | Mayhew | |
| 8,310,485 B1 | 11/2012 | Yu et al. | |
| 8,407,575 B1 | 3/2013 | Goldman et al. | |
| 8,694,889 B2* | 4/2014 | Tilton ..................... | G06T 13/80 345/473 |
| 2006/0132482 A1* | 6/2006 | Oh .......................... | G06T 13/80 345/419 |

(Continued)

FOREIGN PATENT DOCUMENTS

WO    2005055138 A2    6/2005

OTHER PUBLICATIONS

PowerPoint 2013, "Applying Transitions", Aug. 2013, http://www.gcflearnfree.org/print/powerpoint2013/applying-transitions?playlist=PowerPoint_2013, pp. 6.*
PowerPoint 2010: Animation and Slide Transitions, Jun. 23, 2011, WPI Teaching with Technology Collaboratory, pp. 4.*

(Continued)

*Primary Examiner* — Chau T Nguyen
(74) *Attorney, Agent, or Firm* — Fletcher Yoder PC

(57) ABSTRACT

Animation by creating intermediate objects for transitioning between two objects having a mappable function. In certain implementations a processor determines whether a first object in a first slide in the slide presentation differs from a matching second object in a second slide in the presentation in one or more properties that have one or more corresponding known mappable transition functions other than translation, rotation, or scaling transitions. Furthermore, the processor creates one or more intermediate objects that incrementally reflect changes from the first object to the second object based at least in part on the one or more mapped transition functions where the one or more intermediate objects are configured to smooth the transition from the first object to the second object.

24 Claims, 14 Drawing Sheets

(56) References Cited

U.S. PATENT DOCUMENTS

| | | | |
|---|---|---|---|
| 2008/0313214 A1* | 12/2008 | Duhig | G06F 17/30038 |
| 2009/0172549 A1 | 7/2009 | Davidson | |
| 2010/0064223 A1* | 3/2010 | Tilton | G06T 13/80 |
| | | | 715/732 |
| 2010/0223554 A1 | 9/2010 | Tilton | |
| 2011/0181521 A1* | 7/2011 | Reid | G06F 3/0483 |
| | | | 345/173 |
| 2011/0306397 A1 | 12/2011 | Fleming et al. | |
| 2012/0280991 A1 | 11/2012 | Maloney et al. | |
| 2013/0097552 A1 | 4/2013 | Villaron et al. | |
| 2014/0247268 A1* | 9/2014 | Drucker | G06T 11/206 |
| | | | 345/440.2 |

OTHER PUBLICATIONS

Peter Hillier-Brook, Jean Hollis Weber, Michele Zarri, "Chapter 9 Slide Shows—Transitions, animations, and more", Copyright 2007-2009, published by OpenOffice.org3, pp. 25.*

* cited by examiner

OBJECT MATCHING AND ANIMATION IN A PRESENTATION APPLICATION

BACKGROUND

The present disclosure relates generally to the matching of objects on sequential screens, such as on sequential slides of a slideshow presentation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the presentation of information to an audience, a presentation application implemented on a computer or other electronic device is commonly employed. For example, it is not uncommon for various types of public speaking, (such as lectures, seminars, classroom discussions, speeches, and so forth), to be accompanied by computer generated presentations that emphasize or illustrate points being made by the speaker. Such presentations may include music, sound effects, images, videos, text passages, numeric examples or spreadsheets, charts, graphs, or audio-visual content that emphasizes points being made by the speaker.

Typically, these presentations are composed of "slides" that are sequentially presented in a specified order and which each contain objects of various types that help convey the information to be presented. Conventionally, to transition between slides, a first slide would be replaced by a second slide on the screen. In such transitions some level of animation or some type of effect may be employed, but typically little thought is given to the individual objects on each slide. Instead, in the simplest implementations, each slide may instead be treated as a static object. Due to the prevalence of such computer-generated and facilitated presentations, one challenge is to maintain the interest level generated by such presentations, i.e., to keep the audience interested in the material being presented on the screen.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for providing object-aware transitions between slides of a presentation. Such object-aware transitions may include identifying matched objects on sequentially presented slides, where possible. In one embodiment, such matching may be implemented using a matching function or algorithm that is optimized. For example, in one embodiment, matched objects are identified by minimizing (or maximizing) a cost function such that the best object matches are yielded when the function in question is optimized. Once identified, the matched objects may be transitioned differently than unmatched objects. For example, matched objects may remain displayed during the transition, being animated from how they appear on the outgoing slide to how they appear on the incoming slide. Conversely, unmatched objects may be removed from or brought into view as the slide transition occurs.

Further, with respect to the matched objects, different levels or degrees of matching may be provided, such as exact matches, maximal matches, minimal matches, and partial matches, where the different degrees of levels of matching may generally correspond to the types or degrees of differences between the presentation of a pair of matched objects on an outgoing slide and on an incoming slide. For example, various object properties of a pair of matched objects may differ on the outgoing and incoming slide. Such object properties may include, but are not limited to, the location, rotation, and/or scale of the objects, the color or fill of the objects, the color or border type of the objects. Similarly, with respect to character-based objects, various characters may differ or the font, font size, font color, or other font effects or emphasis may differ. As a result the different levels or degrees of matching of objects may in turn result in different animations or effects being employed to accomplish the transition from how a matched object appears in the outgoing slide to how the corresponding matched object appears in the incoming slide.

Further, with respect to partial matches, a match may be characterized as a partial match if a difference between the matching objects corresponds to a known mappable function and is not classified as a maximal (e.g., geometric) property. With partial matches, a different animation type may be used than those used for other match types. Specifically, a transition between objects with a partial match may be transitioned by creating intermediate frames and/or objects that smooth the transition between the objects using the known mappable function.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosure is generally directed to providing object matching between slides of a presentation. In particular, in accordance with the present disclosure, different objects within each slide are matched and can be separately and independently handled during slide transitions as compared to unmatched objects. In certain embodiments, this involves matching objects on both an outgoing and incoming slide and providing specific animation or handling for those matched objects. Further, different degrees or levels of object matches may be provided and this information may also be leveraged in the slide transition process. With this in mind, examples of suitable devices for use in accordance with the present disclosure are as follows.

Figure 1:
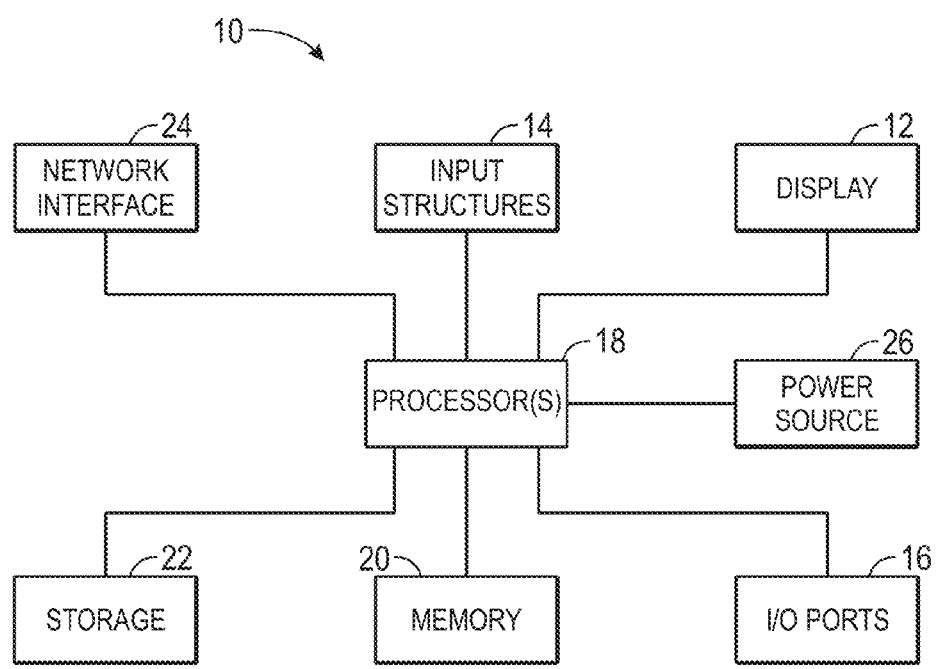
FIG. 1 is a block diagram of an electronic device that may use the techniques disclosed herein, in accordance with aspects of the present disclosure.
Figure 2:
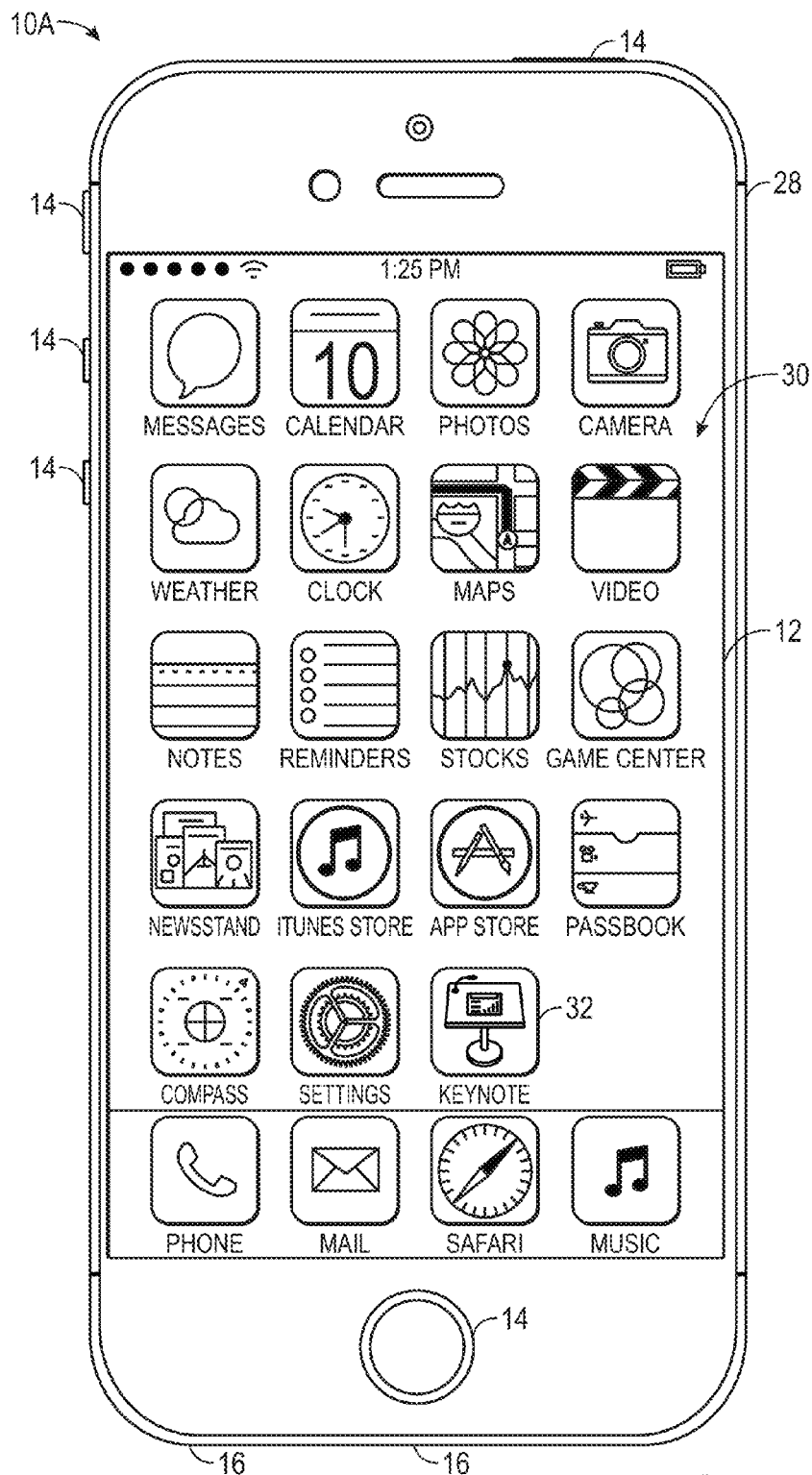
FIG. 2 is a front view of a handheld device, such as an iPhone® by Apple Inc., representing an example of the electronic device of FIG. 1.
Figure 3:
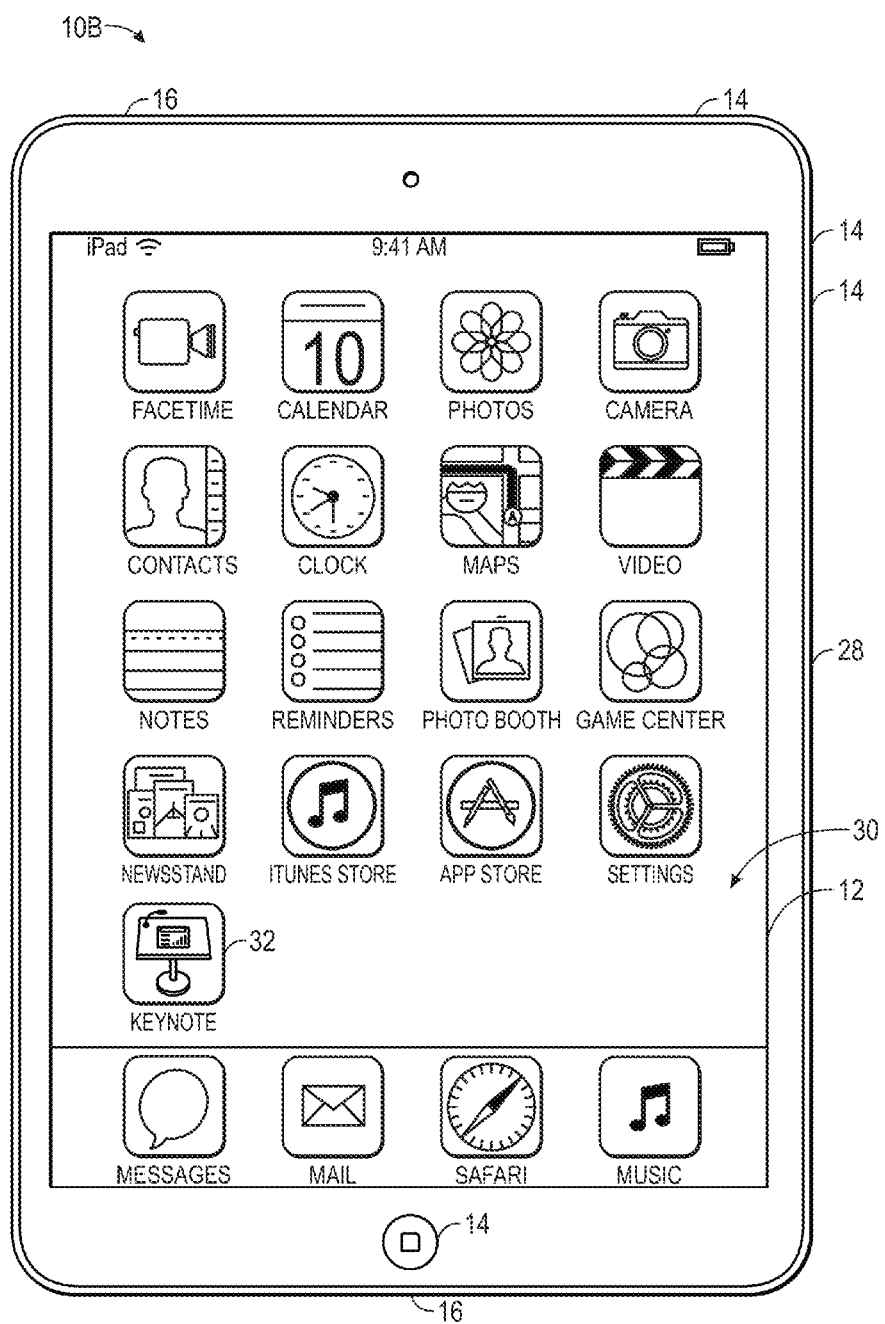
FIG. 3 is a front view of a tablet device, such as an iPad® by Apple Inc., representing an example of the electronic device of FIG. 1.
Figure 4:
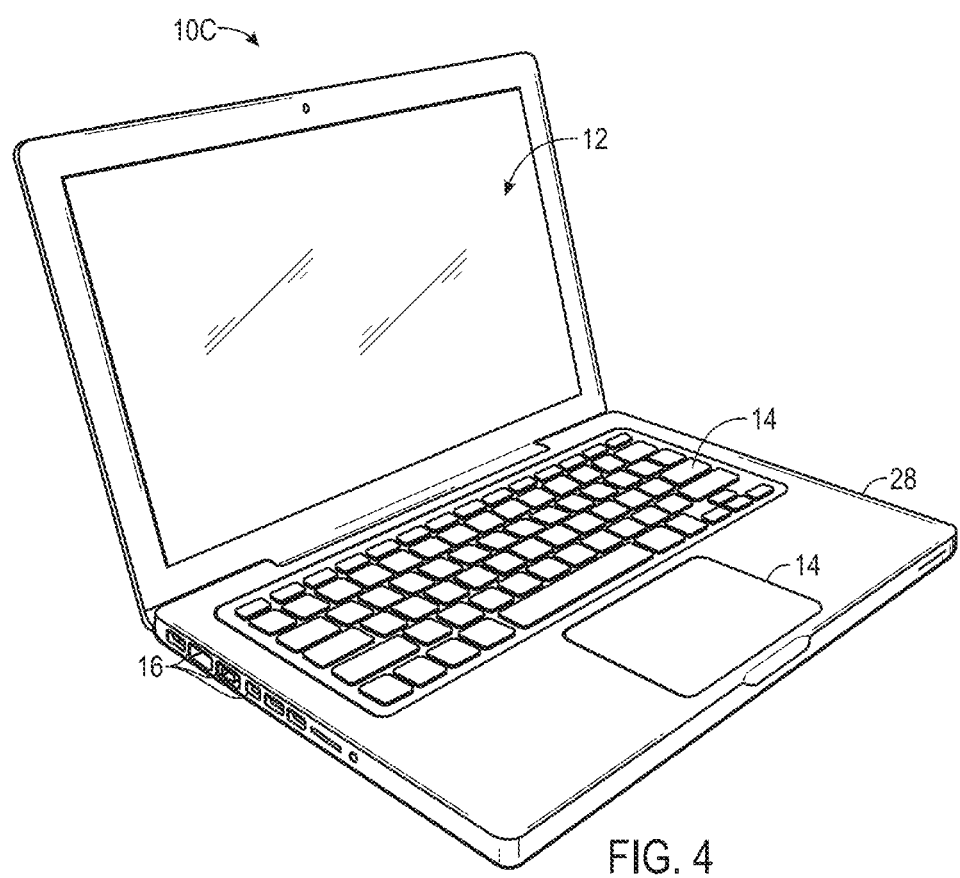
FIG. 4 is a perspective view of a notebook computer, such as a MacBook Pro® by Apple Inc., representing an example of the electronic device of FIG. 1.

A variety of suitable electronic devices may employ the techniques described herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Keynote® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a presentation application program (e.g., Keynote® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the presentation application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Keynote® by Apple Inc.) running on the computer 10C.

Figure 5:
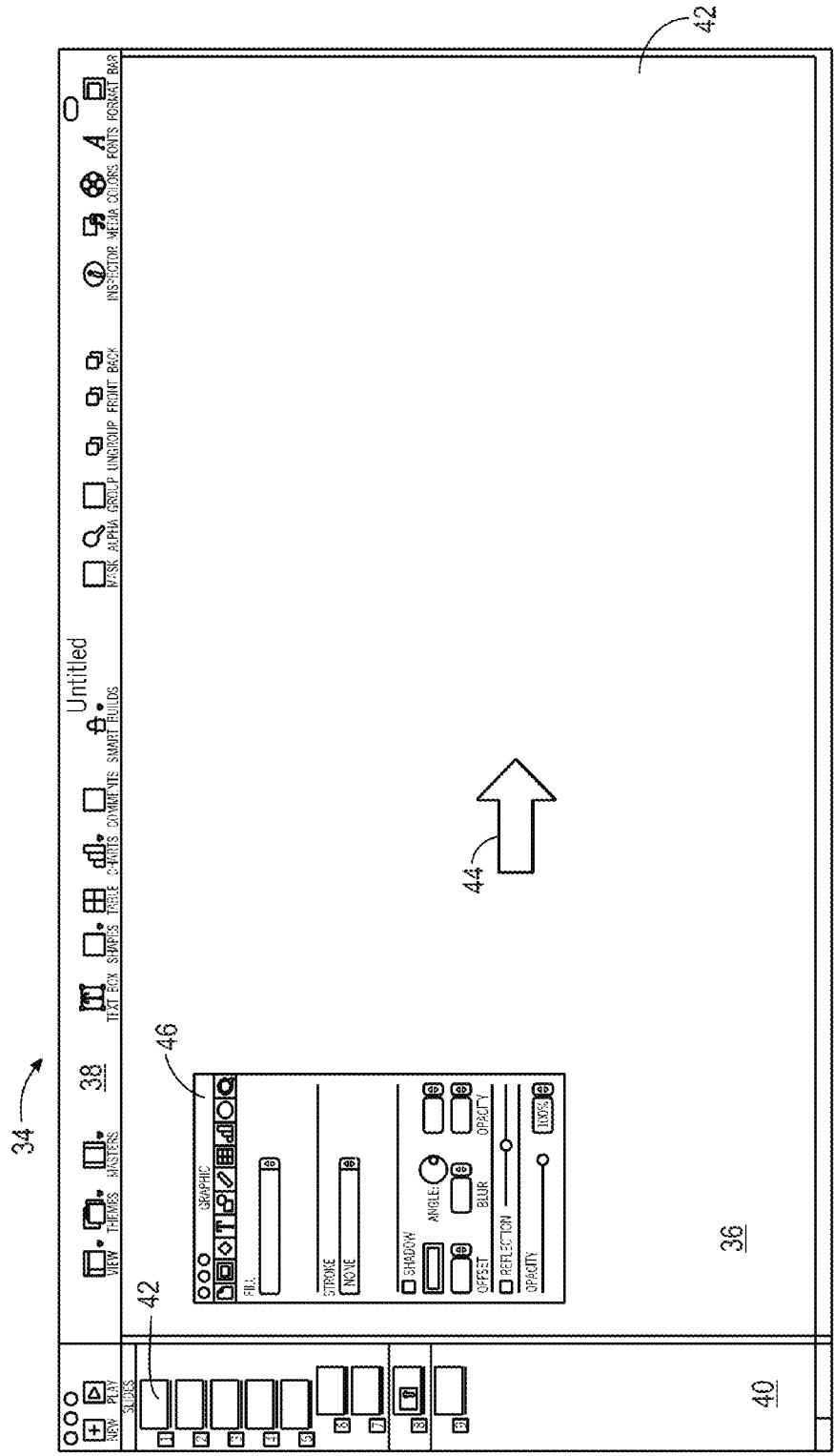
FIG. 5 illustrates a edit mode screen of a presentation application in accordance with aspects of the present disclosure.

With the preceding in mind, a variety of computer program products, such as applications or operating systems, may use the techniques discussed below to enhance the user experience on the electronic device 10. Indeed, any suitable computer program product that includes a canvas for displaying and/or editing shapes or images may employ some or all of the techniques discussed below. For instance, the electronic device 10 may run a presentation program 34 (e.g., Keynote® from Apple Inc.) as shown in FIG. 5. The presentation application 34 shown in FIG. 5 may provide multiple modes of operation, such as an edit mode and a presentation mode. In FIG. 5, the presentation application 34 is shown in the edit mode. In the edit mode, the presentation application may provide a convenient and user-friendly interface for a user to add, edit, remove, or otherwise modify the slides of a slide show. To this end, the presentation program 34 may include three panes: a canvas 36, a toolbar 38, and a slide organizer 40. The canvas 36 may display a currently selected slide 42 from among the slide organizer 40. A user may add content to the canvas 36 using tool selections from the toolbar 38. Among other things, this content may include objects 44 such as text boxes, images, shapes, and/or video objects.

As used herein, a "slide" should be understood to refer to a discrete unit of an ordered or sequential presentation. Such a slide, therefore, may be understood to function as a container for a set of objects (as discussed below) that together convey information about a topic of a presentation. For example, each slide may contain or include different types of objects that explain or describe a concept to which the slide is directed. Further, because a slide may contain multiple objects, a slide may have an associated z-ordering of those objects as they are displayed on the slide. That is, to the extent that objects on the slide may overlap or interact with one another, they may be ordered or layered with respect to a viewer such that some objects are on top of or beneath other objects as they appear on the slide. In this way, a slide may not only have a width and length associated with it, but also a depth.

Further, as used herein, the term "object" may be understood to refer to any discretely editable component on a slide of a presentation. That is, something that can be added to a slide and/or be altered or edited on the slide, such as to change its location, orientation, or size or to change its content, may be described as an object. Examples, of objects may include, but are not limited to, text or number objects, image objects, video objects, chart or graph objects, shape objects, audio objects, and so forth. For example, a graphic, such as an image, a photo, a shape, a line drawing, clip-art, a chart, a table, or a graph that may be provided on a slide, may constitute an object. Likewise, a character or string of characters (text or numbers) may constitute an object. Likewise, an embedded video and/or audio clip may also constitute an object that is a component of a slide. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or "texture".

When in the edit mode, the user may assign animations or other effects to the objects on a slide, such as by designing a build for the objects on the slide that governs the appearance and animation of the objects when the slide is presented. For example, while a slide is being shown, the objects on the slide may, in accordance with the build, be animated to appear, disappear, move, or otherwise change appearance in response to automated or user provided cues (such as a mouse click or an automated sequence).

Once the slides of a presentation are designed in the edit mode, the presentation may be played in the presentation mode by displaying one or more slides in sequence for viewing by an audience. In some embodiments, the presentation application may provide a full-screen presentation of the slides in the presentation mode, including any animations, transitions, or other properties defined for each object within the slides.

The order or sequence of the slides in a presentation or slideshow is relevant in that the information on the slides, typically conveyed by the objects placed on the respective slides, is generally meant to be viewed in a specified order and may build upon itself, such that the information on later slides is understandable in the context of information provided on preceding slides. That is, there is typically a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

With the preceding discussion in mind, the depicted example screen shown in FIG. 5 includes three panes: a slide canvas 36, a toolbar 38, and a slide organizer 40 for creating and editing various aspects of a slide of a presentation. With these panes, a user may select a slide of a presentation, add and/or edit the contents of a slide, and animate or add effects related to the contents of a slide. It should be understood that the size of each pane is merely illustrative, and that the relative size of each pane may vary or be adjusted by a user.

The slide organizer 40 may display a representation of each slide of a presentation that is being generated or edited. The slide representations may take on a variety of forms, such as an outline of the text in the slide or a thumbnail image of the slide. The slide organizer 40 may allow the user to organize the slides prepared using the application. For example, the user may determine or manipulate the order in which the slides are presented by dragging a slide representation from one relative position to another. As illustrated in FIG. 5, the slide representations in the slide organizer 40 may be indented or otherwise visually set apart for further organizational clarity.

Selecting a slide representation in the slide organizer 40 may result in the presentation application displaying the corresponding slide (e.g., slide 42) on the canvas 36. The selected slide 42 may include one or more suitable objects 44 such as, for example, text, images, graphics, video, or any other suitable object. A user may add or edit features or properties of the selected slide 42 when displayed on the slide canvas 36. For example, a user may edit settings or properties associated with the selected slide 42 (e.g., the slide background or template) on the canvas 36 or may edit the location, orientation, size, properties, and/or animation of objects (e.g., object 44) in the selected slide. The user may select a different slide to be displayed for editing on slide canvas 36 by selecting a different slide representation from the slide organizer 40.

In the depicted implementation, a user may customize objects 44 associated with the slide 42 or the properties of the slide 42 using various tools provided by the presentation application 34 in association with the canvas 36. For example, the toolbar 38 may provide various icons that activate respective tools and/or functions that may be used in creating or editing the slide 42. For example, the toolbar 38 may include an icon that, when selected, activates a build tool that allows one or more objects (e.g., images, tables, videos, etc.) to be selected and/or grouped Animations (motion, rotation, changes in size, shading, color, opacity, and so forth) may be generated for such selected objects or groups of objects. In some embodiments, the animations may be rendered in real-time (e.g., using dedicated graphics circuitry, such as a GPU on a video card) when slides containing the animations are displayed or presented as part of a presentation.

In some embodiments, the presentation application 34 may allow a control window 46 to be opened or displayed. The presentation application 34 may display the control window 46 automatically (e.g., based on the presentation application context) or in response to a user instruction (e.g., in response to a user instruction to display options related to one or more selected objects). The control window 46 may be moved, resized, and/or minimized/maximized independently of the panes 36, 38, and 40 (e.g., as an overlaid window). The control window 46 may provide one or more user input mechanisms of any suitable type, such as drop down menus, radio buttons, sliders, and so forth. The options available from control window 46 may vary based on a tool selected in toolbar 38 or by a type of object(s) 44 selected on the slide 42. For example, the control window 46 may provide different respective options if a table, video, graphic, or text is selected on the slide 42 or if no object 44 is selected. It should be understood that although only one control window 46 is shown in FIG. 5, the presentation application 34 may include any suitable number of control windows 46.

With the preceding discussion in mind, various techniques and algorithms for implementing aspects of the present disclosure using such a presentation application 34 running on a device 10 having suitable hardware and memory devices are discussed below.

Figure 6:
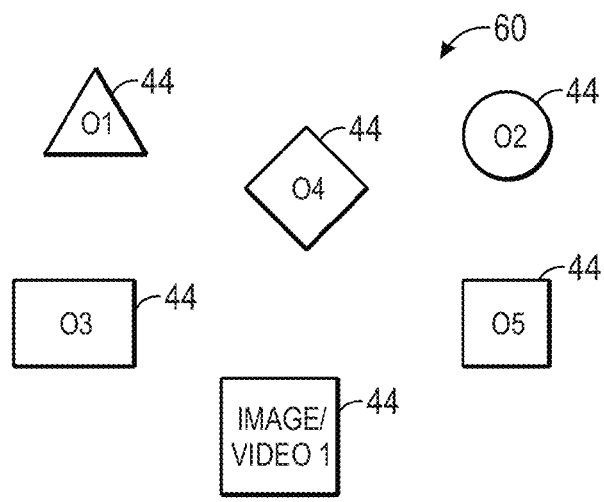
FIG. 6 depicts an example of an outgoing slide having multiple objects to be matched, in accordance with aspects of the present disclosure.

Turning to FIG. 6, an example of an outgoing slide 60 is depicted. Such an outgoing slide 60 is typically a discrete unit of a presentation (e.g., a slideshow presentation) that typically includes multiple slides that are sequentially displayed. In such an example, an outgoing slide 60 represents a slide that is being displayed at the beginning of a slide transition and which will be transitioned off of the display as an incoming slide is transitioned on to the display.

Figure 7:
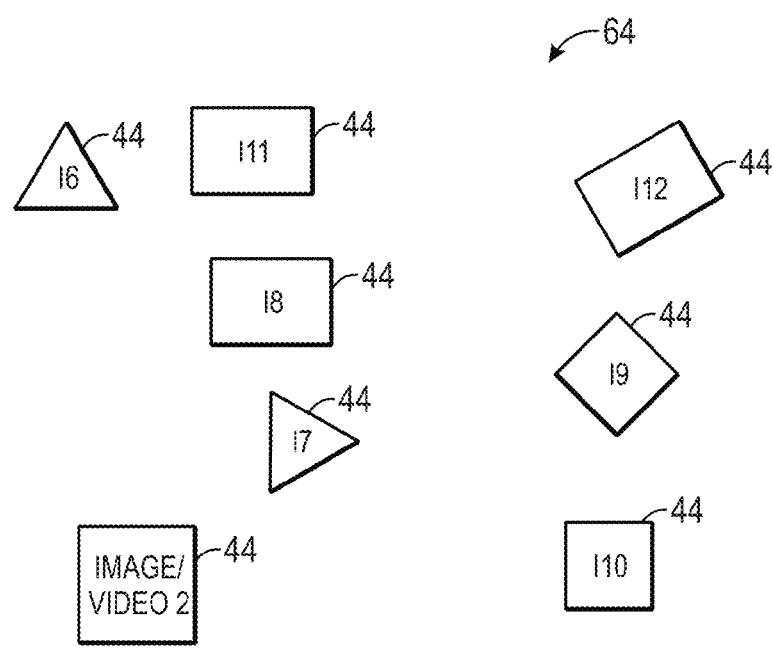
FIG. 7 depicts an example of an incoming slide having multiple objects to be matched, in accordance with aspects of the present disclosure.

As discussed herein, in one embodiment the objects 44 provided on the slides of a presentation are identified, automatically or by a user, allowing each object 44 to be independently manipulated, such as animated, when transitioning between slides. That is, for a slide being transitioned out (i.e., an outgoing slide 60), each object 44 may be separately handled, so that different objects or types of objects may be differently animated as part of the transition. In certain embodiments, a transition between slides may take into account whether a given object 44 present on the outgoing slide 60 has a match on the incoming slide 64 (FIG. 7). By way of example, an object 44 on an outgoing slide 60 that is determined to be matched to an object 44 on an incoming slide 64 may be animated differently during a transition than objects 44 present only on one of the outgoing or incoming slide 60 and 64. For example, an object on the outgoing slide 60 that is matched to an object on the incoming slide 64 may continue to be displayed during the slide transition, with some animation effect or effects applied to transition the object from how it appears on the outgoing slide 60 to how it appears on the incoming slide 64. Conversely, objects present on only one of the outgoing or incoming slide 60, 64 will typically be displayed for a portion of the slide transition, such as to animate the object on to (i.e., to introduce the object) or off of (i.e., to remove the object) the display. Thus, in one implementation, an object may be matched to a corresponding object in a subsequent slide (though it may be in different locations, orientations, or at a different scale in the two slides) and an animation may be applied to the object such that the object appears to move, turn, resize, and so forth to reach the appropriate size, location, and/or orientation in the incoming slide after the transition.

As discussed herein, the identification and matching of objects 44 may be performed automatically in accordance with one or more matching algorithms. By way of example, in one embodiment objects 44 may be matched (or not matched) on an outgoing slide 60 and incoming slide 64 based upon optimization of a mathematical matching function (e.g., a cost function), such as by minimization or maximization of the matching function. In practice, a matching function used to match objects on two or more slides may be specific to the types of objects under consideration. For example, such functions may be implemented so that objects may be matched only with other objects of the same object class. That is, in such an implementation, a video clip may only be matched with another video clip, a picture matched with another picture, a character string matched with another character string, a shape matched with another shape, and so forth.

Factors that may be considered in such a matching function include, but are not limited to: location differences, scale differences, rotation differences, differences in shape, differences in file name, differences in file location, differences in color or fill, differences in texture, differences in borders, difference in character strings, differences in font, font size or emphasis, and character color in the context of character strings, and so forth. These and other factors, typically properties of the objects in question, may all contribute to the determination as to whether two objects on sequential slides are matched with respect to the matching function.

In certain instances, the matching function may be defined and invariant for a class of objects, such as for shapes, for images, or for character strings. Conversely, in other instances the matching function used to identify matches for an object may be modified or adjusted based upon the object for which a match is being evaluated. That is, the matching function as implemented may vary on an object-by-object basis within a class based upon factors specified for a respective object. For example, a given shape object may be generally matched using a matching function specific to the object class (e.g., shapes) or to a more specific object descriptor (e.g., square shapes). However, the matching function used to evaluate matches for a specific object of this class may be further modified by criteria specified for that specific object. Thus, matches for a square object may be generally evaluated by a shape or square shape matching function, which may be modified based on factors specified or defined specifically for a given object, such as to overweight (or underweight) certain object properties considered by the matching function (e.g, distance or scale differences, and so forth). In this manner, factors specified for an object itself may influence the matching process (i.e., a respective object may effectively have input into possible matches for that object).

By way of example, turning to FIGS. 6 and 7 for a given outgoing slide 60, five objects 44 of a given class (e.g., shapes) may be present (e.g., O1, O2, O3, O4, and O5). Similarly, the incoming slide 64 may include seven objects 44 (e.g., I6, I7, I8, I9, I10, I11, and I12) of the same class. Other objects not of that class (e.g., images or video) may also be present on slides 60 or 64, but would not be evaluated for matches with the class in question and instead would be evaluated for matches within their own class. In this example, a matching function may be defined and used to determine a cost or score for each possible combination of objects within the relevant class (e.g., shapes). As noted above, in some instances the matching function may be modified with respect to determining matches for a particular object based on one or more criteria specified for that object, such as to overweight or underweight proximity, scale differences, rotation differences, border thickness differences, shape correspondence, color or shading differences with respect to the fill or borders, or other object properties or property differences. By way of example, Table 1 depicts an example of sample scores associated with the objects 44 present on outgoing slide 60 and incoming slide 64. In this example, optimization is in the form of minimizing the matching function, hence low scores correspond to a better match. As will be appreciated, optimization could also take the form of maximizing a given matching function while still achieving the same or similar results.

TABLE 1

Sample Match Scores for Objects in FIGS. 6 and 7

|    | I6   | I7   | I8   | I9   | I10  | I11  | I12  |
|----|------|------|------|------|------|------|------|
| O1 | 0    | 0.5  | 1.25 | 1.35 | 1.45 | 1.15 | 1.55 |
| O2 | 1.3  | 1.3  | 1.2  | 1.3  | 1.4  | 1.2  | 1.2  |
| O3 | 1.3  | 1.25 | 0.25 | 1.45 | 1.4  | .45  | .65  |
| O4 | 1.25 | 1.35 | 1.15 | .25  | .75  | 1.45 | 1.6  |
| O5 | 1.45 | 1.35 | 1.25 | .75  | .25  | 1.35 | 1.55 |

In this example, therefore, a table generated for all possible matches and the associated scores for those matches, allows matches to be identified for certain of the objects 44 between the outgoing slide 60 and the incoming slide 64. Scores may be selected from the table that optimize the matching function in question. In certain instances, no match is identified for an object present on either the outgoing slide 60 or the incoming slide 64. In certain implementations one or more thresholds may be employed such that, beyond that threshold, a score cannot be construed as indicating a match even if that score is the lowest (or highest) for that object. In this example, a value of 1.0 is employed as such a threshold, with scores equal to or over 1.0 being ineligible to be deemed a match.

Turning back to Table 1, in this example, objects O1 and I6 are deemed a match, as are objects O3 and I8, O4 and I9, and O5 and I10. Indeed, objects O1 and I6 are, for the purpose of this example, identical in terms of shape, rotation, location, and scale factor and may, therefore, be deemed an exact match (here indicated by a score of 0), as discussed in greater detail below. Conversely object O2 of the outgoing slide 60 and objects I7, I11, and I12 of the incoming slide 64 may be deemed as not having matches on the counterpart slide. Based on these matches (or absence of matches) a transition between outgoing slide 60 and incoming slide 64 may be constructed such that matched objects are animated differently than unmatched objects during the transition. For example, matched objects may be displayed throughout the transition, being animated from how the matched object appears on the outgoing slide 60 to the incoming slide 64, while unmatched objects may be removed from view or introduced to view as part of the slide transition effect.

Figure 8:
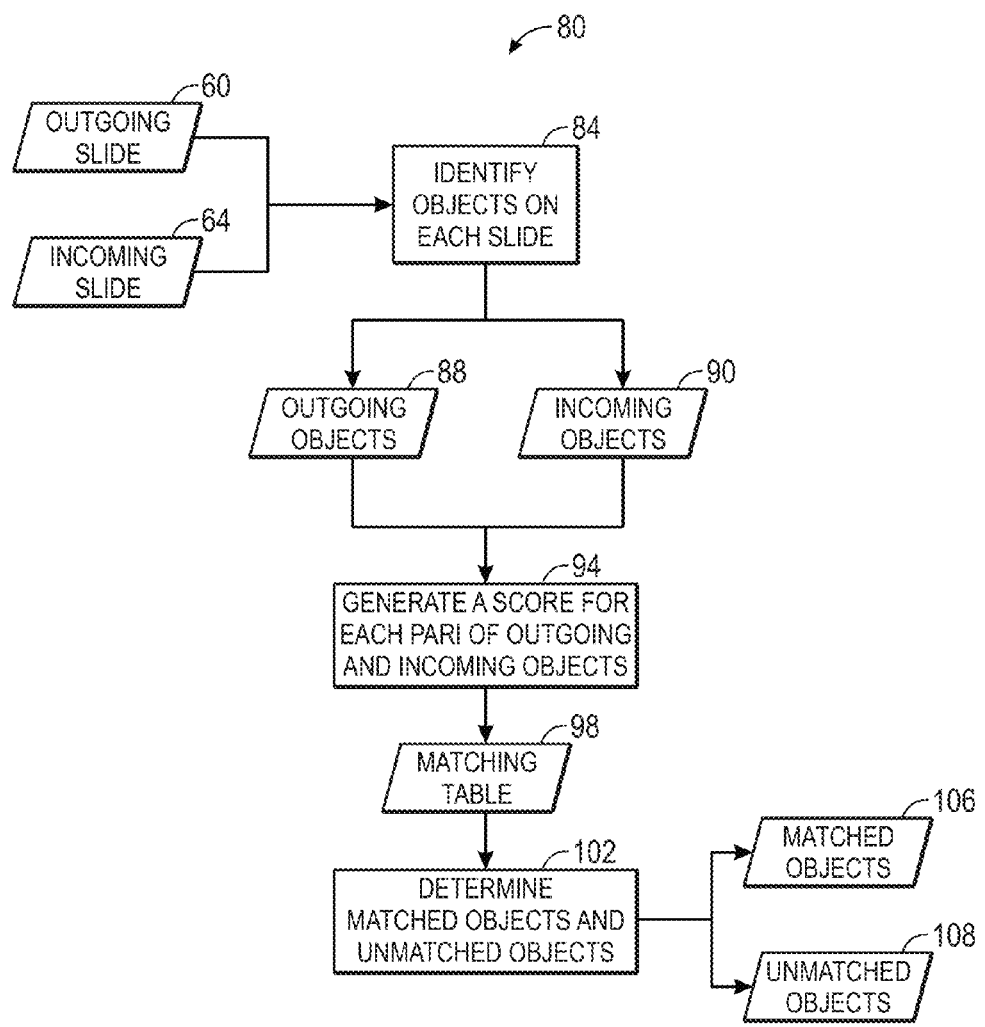
FIG. 8 depicts an example of control flow logic implemented as an algorithm for matching objects, in accordance with aspects of the present disclosure.

The above approach may be summarized as control logic which may be implemented as a matching algorithm 80, shown in FIG. 8 that may be stored as a processor-executable routine on a suitable storage medium and implemented as a function of a presentation application, as discussed herein. In accordance with one such algorithm, objects 44 are identified (block 84) on both an outgoing slide 60 and an incoming slide 64. Based on this identification operation, a set of outgoing objects 88 and incoming objects 90 are identified. Based on a respective matching function that may be specific to each class of object (e.g., shape objects, character strings objects, image objects, video objects, chart objects, graph objects and so forth) a score may be generated (block 94) for each combination of eligible incoming and outgoing objects 90, 88. As noted above, in some embodiments, a given object may itself influence or modify the matching function used in assessing matches for the given object.

For a given set of eligible incoming and outgoing objects 90, 88 associated with a given matching function, the respective scores may be aggregated and analyzed, such as by generating a matching table 98. Depending on the manner in which the respective matching function is being optimized (e.g., by minimizing or maximizing the matching function), the scores for each combination of eligible objects may be analyzed (block 102) for optimizing values. That is combinations of incoming and outgoing objects 90, 88 having scores that optimize the matching function may be deemed matched objects 106. Conversely, incoming and outgoing objects 90, 88 for which no score is optimizing with respect to the matching function may be deemed unmatched objects 108.

As will be appreciated, differing matching algorithms may be employed for each class of objects being matched, such that a matching table 98 (or similar construct) may be constructed for each type of object class on the incoming and outgoing slides for which matching is desired. In this manner, video objects may be compared to and matched with other video objects. Image objects (e.g., pictures), text boxes, character strings, audio clips, and other objects may also be similarly matched within their object class. For certain classes of objects, the matching algorithm may take into account properties or characteristics particular to the object class in question.

For example, in the context of objects 44 based on character strings, the string object may be matched at least partly based on the string content (i.e., the sequence of characters forming each string), with each character in a string itself being a discrete and separate unit that may be evaluated and animated. Therefore, it may be desirable to at least partly take into account the degree of overlap or similarity between character strings when determining matches. In certain embodiments, evaluation of a character string may include evaluation of sub-strings from which the larger strings are composed. Such character string matching operations may occur on a single table 98 or on a series of tables 98 (e.g., sub-tables in addition to an initial table).

For example, a character string may be present on an outgoing slide 60 and a related, but partially overlapping character string may be present on the incoming slide 64. In one example, the character string "chance of rain" may be present on the outgoing slide 60 and the character string "chance of precipitation" may be present on the incoming slide 64. As will be appreciated, the character strings "chance of rain" and "chance of precipitation" are not identical, though portions of the respective strings are the same.

However, as part of the matching process, substrings within each string may be compared. For example, each of the character strings in this example have the character substring "chance of" in common, in addition to related character substrings contained within this substring (e.g., "chance", "of", "chan", "ance of" and so forth). In practice it may be desirable to utilize the match that generates the most optimized score and which is the longest. For example, while the character substrings "chance of", "chance", and "of" may all be associated with the same matching score (such as the lowest score in an implementation where the matching function is being minimized), the character substring "chance of" may be accepted as the match as being the longest character substring with the lowest score. As will be appreciated, character matching may occur down to the level of individual characters, such that, if no strings of two or more characters are matched, individual characters may still be matched as being present on both the outgoing slide 60 and incoming slide 64 and handled individually with respect to the transition and animation. That is, individual characters may be displayed and animated during the transition so that they remain on the screen, merely being animated to a new location or orientation if needed.

As will be appreciated, the character string (and substring) matching discussed above may be handled in a single scoring table 98, such as Table 1 depicted herein, where matches can be determined based on optimized score and string length. Alternatively, processing may be handled using separate or subtables that may be invoked or generated as needed until a match is found (or not found). For example, an initial table may be generated for matching the full character strings present on both the outgoing slide 60 and incoming slide 64. Failure to find a match may result in a new table being generated dedicated to matching first order character substrings (i.e., character strings from which a single character has been removed) as well as the full substrings (e.g., "chance of rain", "hance of rain", chance of rai") and so forth. In no match is found, a further table may be generated to attempt to find a match within the next round of smaller character substrings until either a match is found or no match is determined to exist.

Figure 9:
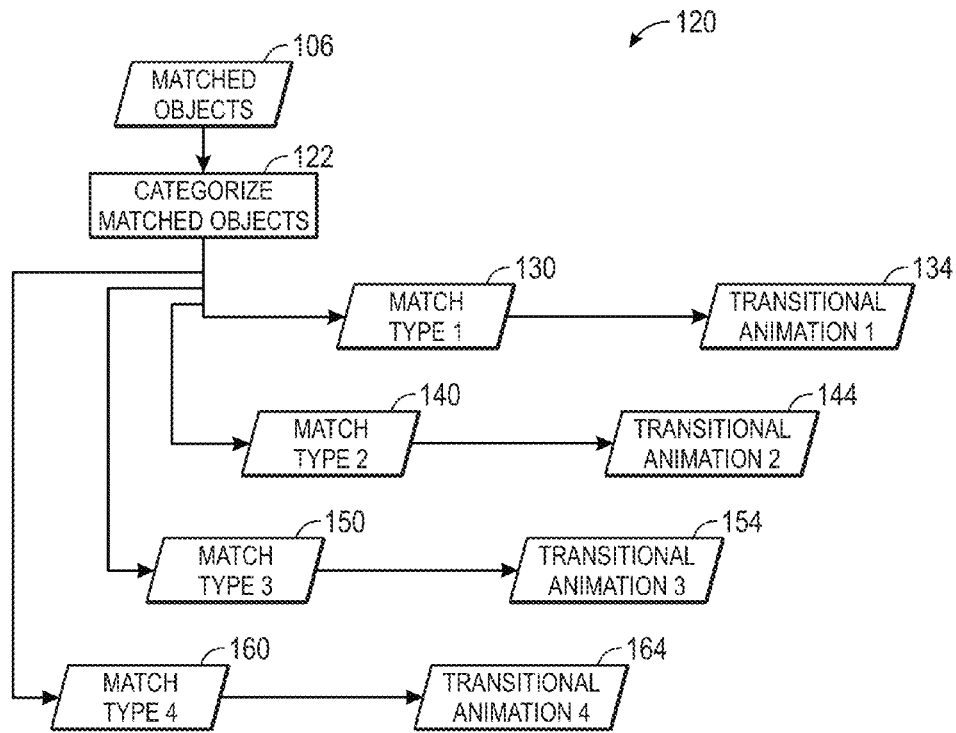
FIG. 9 depicts an example of control flow logic implemented as an algorithm for categorizing matched objects, in accordance with aspects of the present disclosure.

While the preceding relates to approaches for matching objects 44 on different slides by optimizing a matching function, in certain implementations an additional level of categorization for matched objects 106 may be implemented. For example, turning to FIG. 9, an additional processor-executable algorithm 120 is depicted in which the various matched objects 106 undergo further categorization (block 122) based on one or more defined factors. For example, in practice each object 44 on a slide may be characterized by a variety of object properties that may vary even between matched objects 106. Examples of such properties may include, but are not limited to: object location, object rotation, object scale, object opacity, object line or border type, object line or border color, object fill or fill color, object, object line or border thickness, and so forth.

The degree to which these properties between matched objects 106 differ may determine the type of match assigned (block 122) to a pair of matched objects 106. For example, a first match type 130 may be assigned to a pair of matched objects 106 that are an exact match, such as where all properties of the matched objects are identical. That is, the matched objects in question appear exactly the same in the outgoing and incoming slides 60, 64. Because of the exact correspondence between how an exactly matched object 130 appears in the outgoing slide 60 to how the matched object appears in the incoming slide 64, the transitional animation (i.e., first transitional animation 134) for transitioning such exactly matched objects 130 may effectively continue to display the matched object as it appears on the outgoing slide 60 throughout the slide transition.

In some instances, matched objects 106 may appear differently on the outgoing slide 60 and the incoming slide 64, but the differences may be transitioned between using a basic animation or a combination of basic animations. For example, in such instances the matched objects 106 on the outgoing slide 60 and incoming slide 64 may have object properties that only differ in one or more of object location, object rotation, object scale. Such a pair of matched objects 106 may not be exactly matched (i.e., may not be a first match type 130), but may still be characterized as being highly matched (e.g., maximally matched), which in this example may correspond to a second match type 140. In this example, such maximally matched objects 140 may be transitioned from how the object appears on the outgoing slide 60 to how the matched object appears on the incoming slide 64 using a basic animation or combination of basic animations (e.g., translation, rotation and/or scaling), here characterized as a second animation type 144.

In other instances, the matched object 106 may be minimally matched, which in this example may correspond to a fourth match type 160. For example, the matched objects 106 may appear differently on the outgoing slide 60 and the incoming slide 64 and the differences may not be transitioned between using basic animations or animations derived using some known or defined transformation function, as discussed below. That is, such minimally matched objects 160 may include matched objects 106 on the outgoing slide 60 and incoming slide 64 that have object properties that differ and for which no automated animation is conventionally available to transition between the appearance of the matched object on the outgoing slide 60 to the appearance of the matched object on the incoming slide 64. For example, one such object property may be the border applied to a shape object, which may in certain instances reflect different brush types or effects that may not be easily transitioned between, such as going from a pencil line object border to a chalk line object border. In such instances, conventional animations are not available to apply in an automated manner, so a fourth animation type 164 may instead be applied to such minimally matched objects 160. Examples of such animations may include, but are not limited to, a cross-fade animation in which the matched object on the outgoing slide 60 is faded out at the same time as the matched object on the incoming slide 64 is faded in, thereby accomplishing the transition of the matched objects.

In one embodiment, an additional category of matched objects may exist between the maximally matched objects 140 and minimally matched objects 160. This third match type 150, which may be characterized as partial matches, may have differences in the object properties between the matched objects 106 on the outgoing and incoming slides 60, 64 that are not subject to simple resolution during slide transition using translation, rotation, or scaling animations. However, the differences in the object properties between the matched objects 106 may be addressable during slide transition by some animation other than a cross-fade animation. In particular, as discussed herein, such partially matched objects 150 may be transitioned using a third animation type 154 where some mapping function may be determined between how the partially matched object appears in the outgoing slide 60 and how the corresponding matched object appears in the incoming slide, allowing a custom animation to be automatically determined and implemented as part of the slide transition. One example of such partially matched object 150 may include objects whose line thickness or line color properties differ on the outgoing slide 60 and incoming slide 64. A known mapping function encompassing the starting point for the object property in question (i.e., on the outgoing slide 60) and the ending point for the object property in question (i.e., on the incoming slide 64) may then be determined and, based on the known frame rate for the transitional animation, used to derive the animation 154 that may be used to transition the partially matched objects 150.

Figure 10:
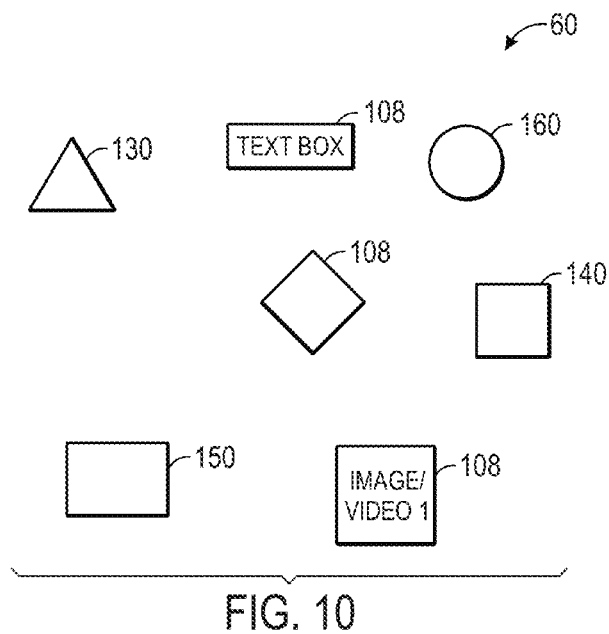
FIG. 10 depicts an example of an outgoing slide having multiple objects to be matched, in accordance with aspects of the present disclosure.
Figure 11:
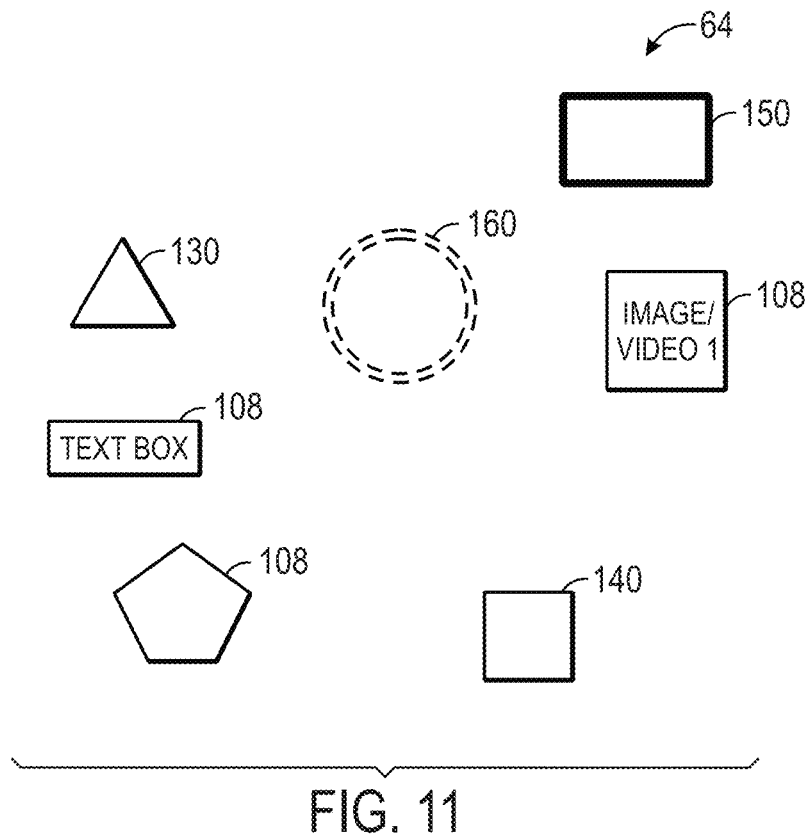
FIG. 11 depicts an example of an incoming slide having multiple objects to be matched, in accordance with aspects of the present disclosure.

Turning to FIGS. 10 and 11, an example is provided of an outgoing slide 60 (FIG. 10) and an incoming slide 64 (FIG. 11) having matched objects of different types. For example, looking at FIGS. 10 and 11, the triangle objects present in the upper left corner of each slide are exact match objects 130, having no object properties that differ. Thus, the triangle object may be transitioned between the outgoing and incoming slides 60 and 64 by continuing to display the triangle object exactly the same way throughout the transition.

An example of a maximal match 140 is also depicted in the two square objects respectively depicted on the outgoing slide 60 and incoming slide 64. In this example, the square is translated (down and left) on the incoming slide 64 relative to the outgoing slide 60, as well as being rotated and larger (i.e., at a different scale). However these differences may all be addressed in a straightforward manner using a combination of conventional translation, rotation, and scaling animations as part of the transitional effects.

An example of a partial match 150 is depicted in the context of the rectangle object at the lower left of the outgoing slide 60 and at the upper right of the incoming slide 64. While the rectangle object is translated between the outgoing slide 60 and incoming slide 64, it is prevented from being a maximal match by the change in thickness of the line border, which cannot be simply addressed using translation, rotation, or scaling animations. Instead, as discussed below, using the respective beginning and ending line thicknesses, a transitional animation 154 may be generated for the rectangle object that not only translates the rectangle object across the screen, but also grows the line thickness as part of the animation.

An example of a minimal match 160 is depicted in the context of the circle object at the upper right of the outgoing slide 60 and at the center of the incoming slide 64. While the circle object is translated between the outgoing slide 60 and incoming slide 64, it also undergoes a change in border type from a single solid line to a dotted dashed line. Such a change in border type cannot simply be animated between the beginning and end states using automated processes. Instead, the transitional animation 164 may simply cross-fade the circle object from how it appears on the outgoing slide 60 to how it appears on the incoming slide 64, i.e., fading the circle object out with respect to the outgoing slide while fading the circle in with respect to the incoming slide.

In addition to the various types of matched objects on the outgoing slide 60 and incoming slide 64, various unmatched objects 108 may also be present. In some instances the unmatched objects 108 may be unmatched because there is no closely corresponding object on the other slide (such as in the case of the depicted diamond object and pentagon object). In other instances, the objects may be unmatched, for purposes of this example, because they are of a different object class than is currently under consideration (such as the depicted text boxes and/or image/video objects).

Figure 12A:
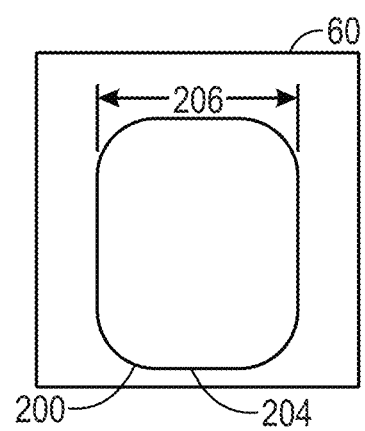
FIG. 12A depicts an example of an outgoing slide that contains an object that is partially matched, in accordance with aspects of the present disclosure.

FIGS. 12A-14D illustrate objects classified in the third match type 150 (e.g., partial match) having one or more properties that have mathematically defined mapping functions. For example, the third match type 150 may occur when a matched pair of objects differ in line thickness, line color, fill color, opacity, shadow effects, or other similar mappable, non-geometrical changes. FIGS. 12A-12D illustrate the transitional animation 154 as an incremental change in border thickness as well as an incremental change in scale in a horizontal direction. FIG. 12A illustrates a rectangular-shaped object 200 having a line thickness 204 and a horizontal width 206 in an outgoing slide 60. FIG. 12D illustrates an incoming slide having a rectangular-shaped object 208 with a thicker line thickness 208 and a greater horizontal width 214. The outgoing slide 60 and the incoming slide 64 are sequential slides in a slide presentation with the incoming slide 64 coming directly after the outgoing slide 60 in a presentation.

As previously discussed, in this example, when the object 200 is matched with the object 208, a matching algorithm classifies the match as the third match type 150 (e.g., partial match) due to the difference between the initial line thickness 204 and the final thicker line thickness 210. The third match type 150 may be selected even though the difference in scaling between the object 200 and the object 208 would otherwise be classified as a second match type; i.e., a maximal match. In other words, when a difference in a property with a known mappable function (e.g., line thickness change) is present alongside a difference in a geometric property (e.g., scale, rotation, translation), the match type is classified as a partial match 150 unless there is a difference in a non-geometric property that does not have a known mappable function (e.g., change single solid line to dotted dashed line), in which case the match type is classified as a minimal match 160.

Figure 12B:
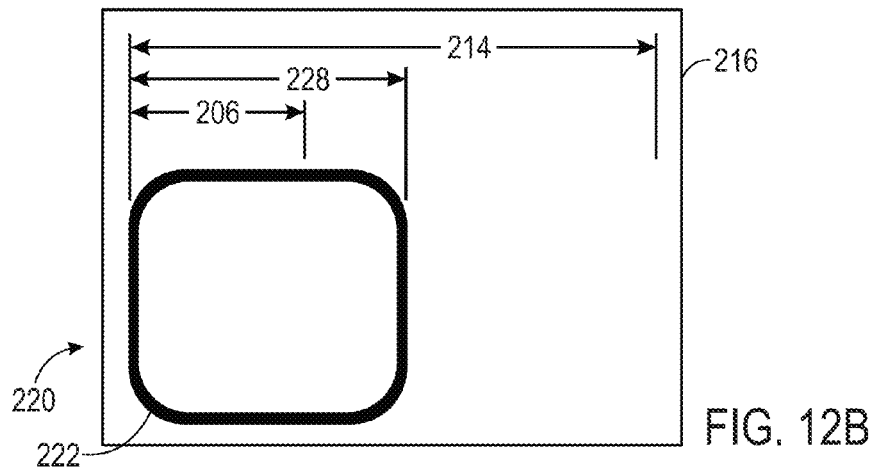
FIG. 12B depicts an example of an intermediate frame that contains an intermediate object with a thicker line thickness and greater horizontal scale than the corresponding partially matched object of FIG. 12A, in accordance with aspects of the present disclosure.
Figure 12C:
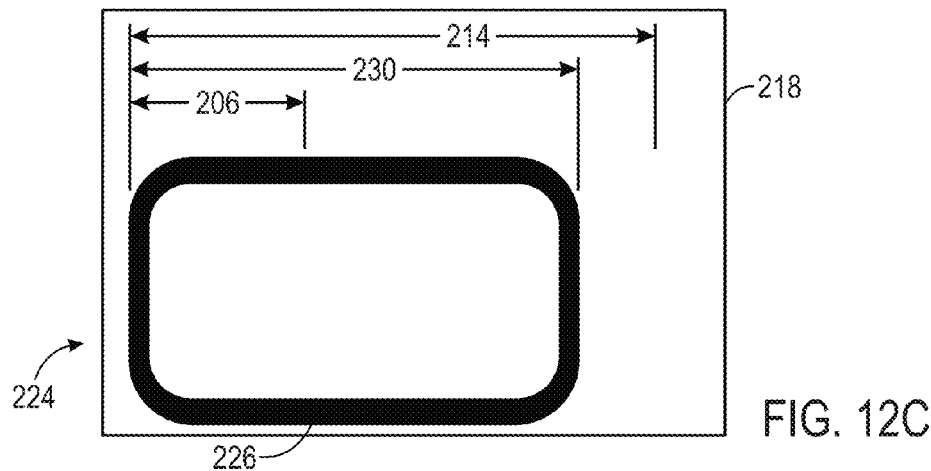
FIG. 12C depicts an example of an intermediate frame subsequent to the intermediate frame of FIG. 12 and with a thicker line thickness and greater horizontal scale than the corresponding intermediate object of FIG. 12B, in accordance with aspects of the present disclosure.
Figure 12D:
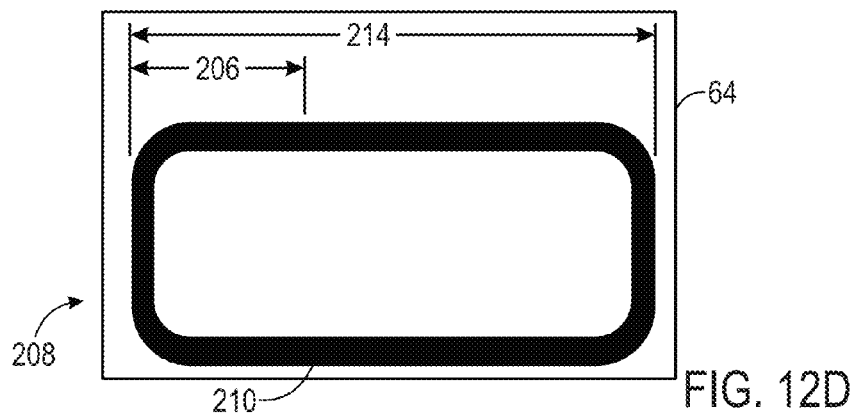
FIG. 12D depicts an example of an incoming slide that contains an object that is partially matched to the object of FIG. 12A as varying only in line thickness and horizontal scale, in accordance with aspects of the present disclosure.

When objects have been matched between outgoing and incoming slides 60, 64 using a partial match animation or display, the third transitional animation type 154 is invoked. In such cases, intermediate frames are created and populated with created intermediate objects to transition from an object in the outgoing slide 60 to a partially matched object in the incoming slide 64. For example, two intermediate frames 216 and 218 may be created to transition the object 200 to the object 208, as illustrated in FIGS. 12B and 12C. Although FIGS. 12A-12D illustrates only two intermediate frames, the number of created intermediate frames may be 1, 2, 3, 4, 5, 10, 15, 20, 25, 30, or more intermediate frames, as determined by the duration of the animation (i.e., run time) and the frame rate (e.g., frames per second).

In certain embodiments, the number of intermediate frames may be determined according to a predetermined number of frames to be displayed between the incoming slide 64 and the outgoing slide 60. For example, in some embodiments, the number of intermediate frames may be predetermined to be 2, 3, 4, 5, 10, 15, 20, 25, 30, 45, 60, or more frames. In certain embodiments, the predetermined number may vary according to the type of property changed. For example, in some embodiments, if the mapped function between the objects corresponds to a first property (e.g., a line thickness change), the predetermined number of intermediate frames may be a certain number. However, if the mapped function between the objects corresponds to a second property (e.g., a fill color change), the predetermined number of intermediate frames may be a different number. When there are two mapped functions, the number of intermediate frames may be selected as the predetermined number of the larger number, smaller number, mean number, median number, another suitable number, or a combination thereof.

In certain embodiments, the number of intermediate frames between the outgoing slide 60 and the incoming slide 64 may be selected by a user using the input structures 14. In such embodiments, the presentation application may receive a set number of frames, a time period over which the transition should be applied, and/or a frame rate of the transition between the outgoing slide 60 and the incoming slide 64. In some embodiments, the presentation application will create as many intermediate frames as possible for use in the presentation based on a frame rate (e.g., 30-60 fps) used when presenting the presentation application as well as a duration (e.g., 1.5 seconds) of the animation transitioning from the outgoing slide to the incoming slide.

Within each frame, the property change having a corresponding known mappable function (and other properties) is transitioned further from the property value for an object of the outgoing slide 60 and closer to the property value for a matched object in the incoming slide 64. For example, in intermediate frame 216 of FIG. 12B, the intermediate object 220 has a line thickness 222 closer to line thickness 204 of the outgoing slide 60 in FIG. 12A than to line thickness 210 of the incoming slide 64 in FIG. 12B. In the next intermediate frame 218, illustrated in FIG. 12C, an intermediate object 224 has a line thickness 226 closer to the line thickness 210 than the line thickness 204. In other words, the intermediate frames depict intermediate objects that incrementally transition at least one property from a value of an object of the outgoing slide 60 to a value of a matched object in the incoming slide 64.

Since the objects 204 and 208 also differ in a horizontal scaling dimension, the intermediate objects may incrementally apply the change of horizontal scale. In other words, the object 222 increases the scale to a horizontal width 228 greater than the original horizontal width 206 but less than a horizontal width 230 of the subsequent intermediate object 224.

Figure 13A:
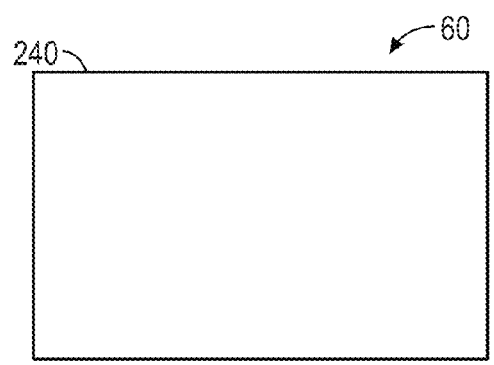
FIG. 13A depicts an example of an outgoing slide that contains an object that is completely opaque and has been partially matched with an object in a subsequent slide and a hidden round object that has been exactly matched to a round object in a subsequent slide, in accordance with aspects of the present disclosure.
Figure 13B:
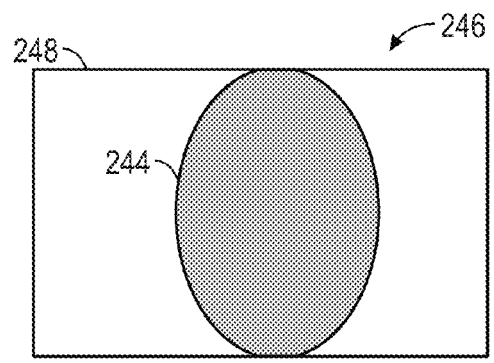
FIG. 13B depicts an example of an intermediate frame that contains an intermediate object that is less opaque than the corresponding partially matched object of FIG. 13A and the exactly matched object of FIG. 13A, in accordance with aspects of the present disclosure.
Figure 13C:
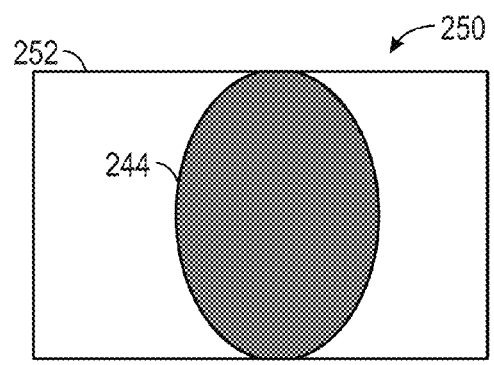
FIG. 13C depicts an example of an intermediate frame subsequent to the intermediate frame of FIG. 13B and contains an intermediate object that is less opaque than the corresponding intermediate object of FIG. 13B and the exactly matched object of FIG. 13A, in accordance with aspects of the present disclosure.
Figure 13D:
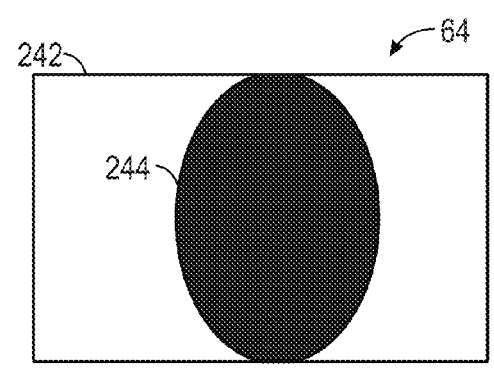
FIG. 13D depicts an example of an outgoing slide that contains a transparent rectangular-shaped object that has been partially matched with the object of FIG. 13A and a round object that has been exactly matched with the hidden round object of FIG. 13A, in accordance with aspects of the present disclosure.
Figure 14A:
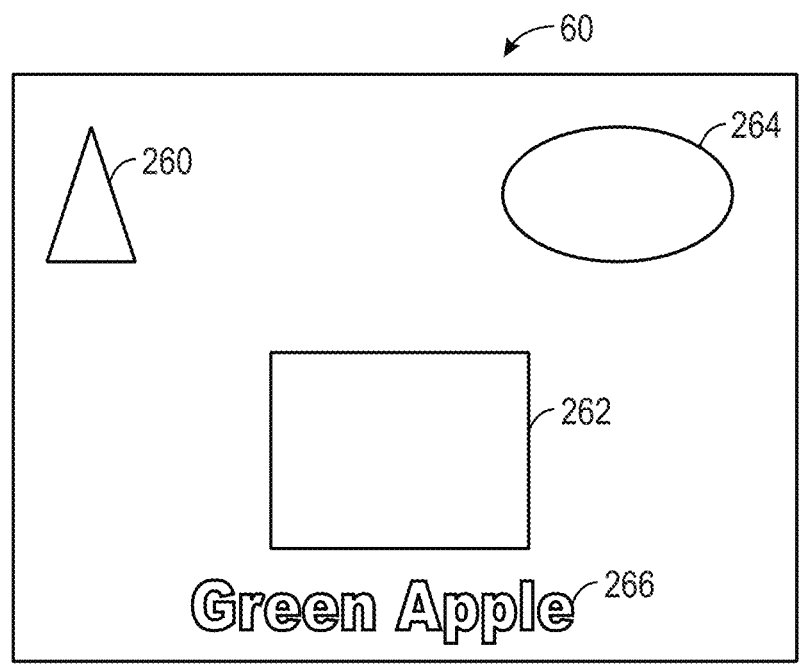
FIG. 14A depicts an example of an outgoing slide that contains an multiple objects that have no shadow, in accordance with aspects of the present disclosure.
Figure 14B:
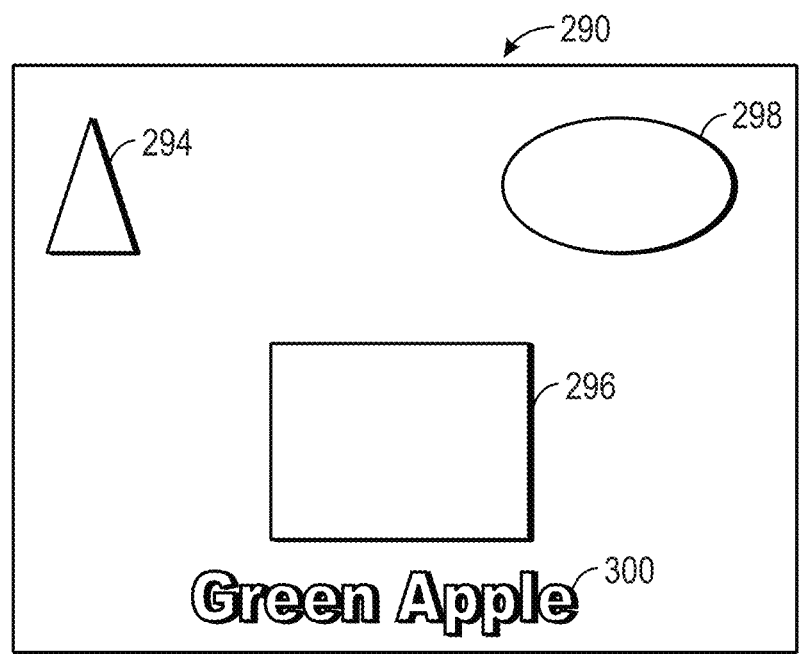
FIG. 14B depicts an example of an intermediate frame that contains objects with larger shadows than the corresponding objects of FIG. 14A, in accordance with aspects of the present disclosure.
Figure 14C:
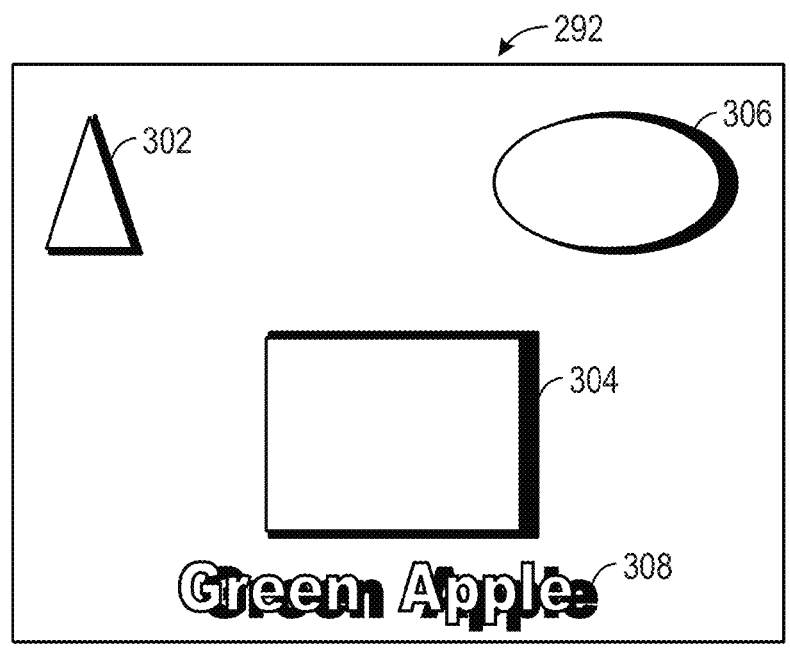
FIG. 14C depicts an example of an intermediate frame subsequent to the intermediate frame of FIG. 14B that contains objects with larger shadows than the corresponding objects of FIG. 14B, in accordance with aspects of the present disclosure.
Figure 14D:
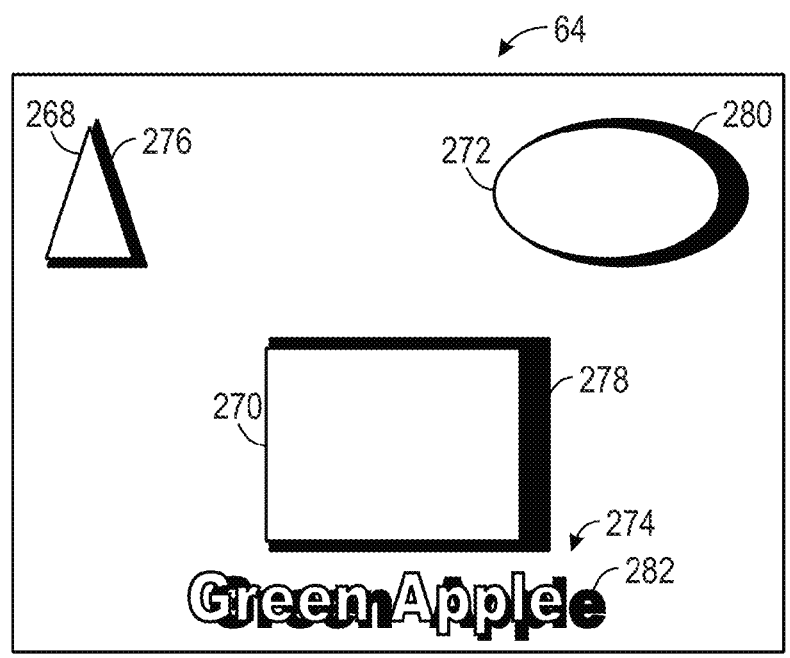
FIG. 14D depicts an example of an incoming slide that contains objects having shadows that have been partially matched to the objects of FIG. 14A, in accordance with aspects of the present disclosure.

FIGS. 13A-13D illustrate another partial match due to a change in opacity between an initial object 240 in an outgoing slide 60 and a matched object 242 in an incoming slide 64. FIG. 13D also illustrates a round object 244. An exact match is made between a round object 244 and an exactly matched object behind the initial object 240. However, the matched object is not visible behind the initial object 240, because the initial object 240 is completely opaque. The round object 244 is visible in FIG. 13D because the matched object 242 has a completely transparent fill. Thus, the initial object 240 and the matched object 242 differ only in opacity, which has a mappable function, i.e., a function that can be indentified or known between two known points, such as the start and end points. Thus, intermediate frames may be made to incrementally vary opacity from an opaque fill to a transparent fill. Moreover, since the round object 244 is an exact match with the corresponding object in the outgoing slide 60, the duplicate object/round object 244 may remain throughout the transition (e.g., on each intermediate frame). In the first intermediate frame 246, a first intermediate object 248 is created with the same properties as the initial object 240 but with a more transparent fill. Thus, the round object 244 becomes partially visible through the initial object. In the second intermediate frame 250, a second intermediate object 252 is created with more transparency than the first intermediate object 248 such that the round object 244 is more visible through the second intermediate object 250 than the first intermediate object 248 but less visible through the second intermediate object 250 than the matched object 242.

FIGS. 14A-14D illustrates a transition from an incoming slide 60 to an outgoing slide 64 where shadow size of one or more objects is varied. Outgoing slide 60 includes a triangular-shaped object 260, a rectangular-shaped object 262, an oval-shaped object 264, and a text object 266. As previously discussed, the shapes 260-266 in the outgoing slide may be matched with objects in the incoming slide 64. For example, the triangular-shaped object 260 may be matched with a matched triangular-shaped object 268. Similarly, the rectangular-shaped object 262, the oval-shaped object 264, and the text object 266 may be respectively matched with a matched rectangular-shaped object 270, a matched oval-shaped object 272, and a matched text object 274. As illustrated, each object in the incoming slide 64 has a shadow associated therewith making the matches, at best, partial matches. Specifically, the matched triangular-shaped object 268, the matched rectangular-shaped object 270, the matched oval-shaped object 272, and the matched text object 274 respectively correspond with a triangular-shaped shadow 276, a rectangular-shaped shadow 278, an oval-shaped shadow 280, and a text shadow 282. In the illustrated embodiment, each of the shadows 276-282 have similar offsets (e.g., right offsets), sizes (e.g., 110%), blurs (e.g., 0 pt), angles (e.g., 0°), and distance (e.g., 4 pt). However, in some embodiments, each shadow may have different characteristics other than shape and may vary in offsets, sizes, blurs, angles, and/or distances.

The triangular-shaped object 260, the rectangular-shaped object 262, the oval-shaped object 264, and the text object 266 may each be considered to have shadows with a size of 0% of the object being shadowed. Furthermore, in some embodiments, other properties such as in offsets, blurs, angles, and/or distances may be considered to be the same setting value as the corresponding shadows in the incoming slide if not previously assigned to another value. In certain embodiments, the objects of the outgoing slide 60 may have specified values for various shadow properties. As long as these properties have a known mathematically mappable function, they may be used to create intermediate objects in accordance with the present approach. If the property does not have a known mappable function and is not geometric in nature, the transition between the outgoing slide 60 and the incoming slide 64 may instead be performed using a cross-fade.

In some embodiments, some special case animations may apply for specific scenarios. For example, if an object with a shadow is matched with a rotated object having a shadow with the same offset, intermediate objects may be rotated from the original image while maintaining the shadow offset. In other words, the intermediate objects have a rotated object but an un-rotated shadow. Another special case may include matched objects that are rotated in relation to each other and which each have a reflection. In intermediate frames depicting an animation morphing the first object into the second object, the intermediate objects may be rotated in a first direction (e.g., clockwise), but the reflection may be rotated in the opposite direction (e.g., counter clockwise) to cause the animation to appear more realistic.

Returning to FIGS. 14A-14D, for purposes of discussion, all properties of the shadows of objects 260-266 will be treated as being the same as the properties of the shadows 276-282 except for size. Accordingly, in the illustrated embodiment, shadow size is the sole difference between the objects 260-266 and the objects 268-274. Thus, intermediate frames 290 and 292 vary only in shadow size for the objects. For example, a first intermediate triangular-shaped shadow 294, a first intermediate rectangular-shaped shadow 296, a first intermediate oval-shaped shadow 298, and a first intermediate text shadow 300 may each be sized between a size of a corresponding original shadow (e.g., 0%) and be matched with a corresponding shadow 276-282 (e.g., 110%). The size may be determined by the mapping function for the property. As illustrated, the mapping function may be linear such that the intermediate values are determined according to the function and the number of intermediate frames. However, as previously discussed, in some embodiments, the function may be non-linear. For example, in certain embodiments, the function may "smooth out" or "smooth in" changes with less dramatic changes between intermediate frames nearer to the outgoing slide 60 and/or the incoming slide 64. In some embodiments, the function may cause more dramatic changes between intermediate frames nearer to the outgoing slide 60 and/or the incoming slide 64 while the transitions are smoother with less dramatic changes in the intervening intermediate frames.

Using a linear mapping function and a number of intermediate frames of two, in the illustrated embodiment, the shadows 294-300 may be created with a shadow size of about 36.7%, which may be determined by the following equation:

$$\Delta_{prop} = \frac{|PV_{inc} - PV_{out}|}{N_{int\_sl}} \quad \text{(Equation 1)}$$

Where $\Delta_{prop}$ is the change in property value between intermediate frames, $PV_{inc}$ is the property value of the property in the incoming slide 64, $PV_{out}$ is the property value of the property in the outgoing slide 60, and $N_{int\_sl}$ is the number of intermediate frames determined in any manner previously discussed. This function may be used when the mapping function is a linear function. Using equation 1, the linear change in shadow size is determined to be about 36.7%. Accordingly, the shadow size of shadows 302-308 of the second intermediate frame 292 may be determined to be about 73.4%.

Figure 15:
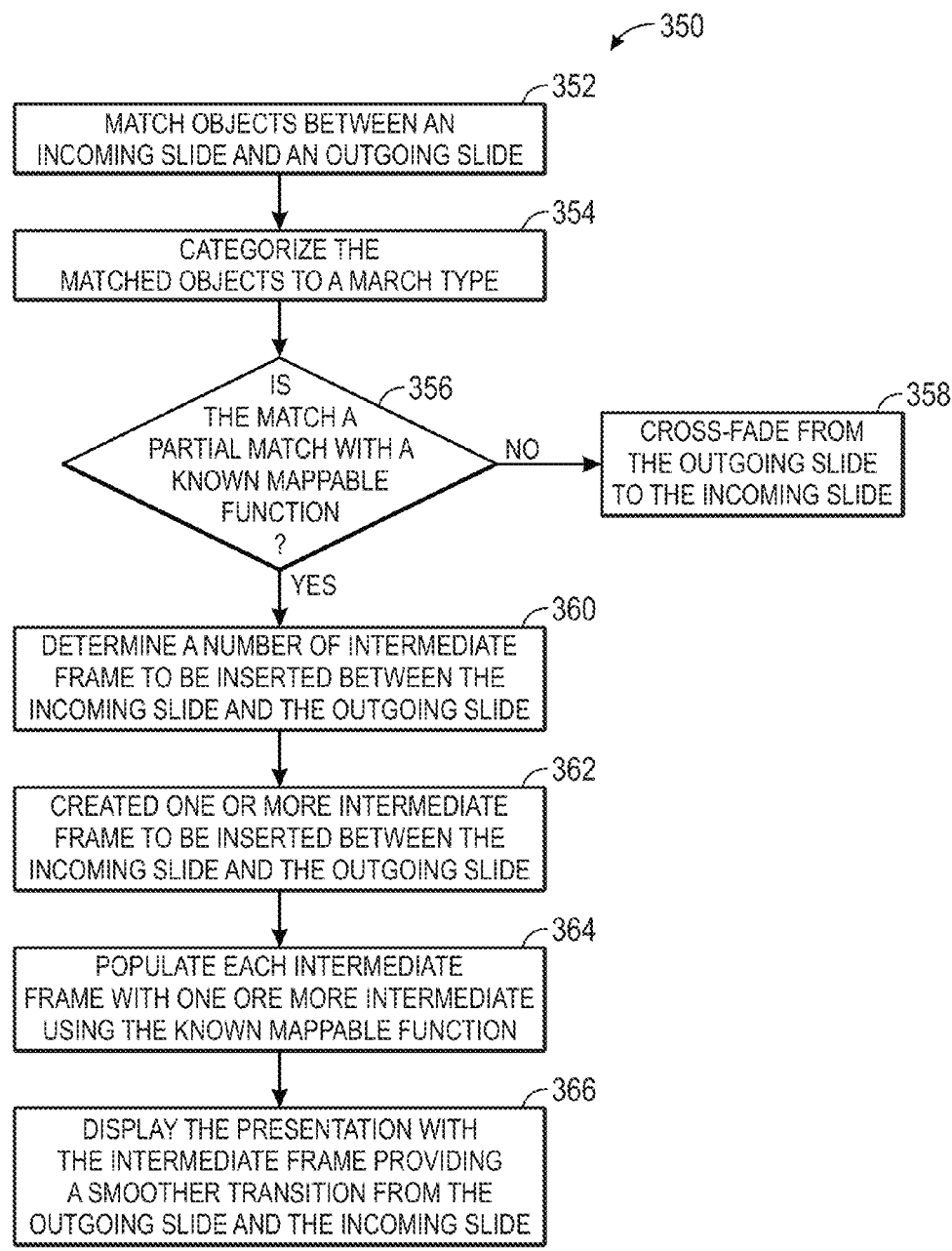
FIG. 15 depicts an example of a process for transitioning between slides in a slide presentation when a partial match exists by using intermediate objects, in accordance with aspects of the present disclosure.

FIG. 15 illustrates a diagram view of a process 350 for smoothing transitions between objects in a slide presentation. The process 350 may be executed by the processor(s) 18 of the electronic device 10. In some embodiments, the process 350 may be stored as instructions in non-transitory, computer-readable medium (e.g., memory 20). The process 350 includes matching objects between an incoming slide and an outgoing slide (block 352) as previously discussed in reference to FIG. 8. The process 350 further includes categorizing the matched objects to a match type (block 354) as previously discussed in reference to FIG. 9. Upon categorization of the match type, the processor(s) 18 determine whether the match type is a partial match (e.g., third match type 150) with a difference in a property value having a known mappable function (block 356). In some embodiments, the partial match is identified only if an exact or maximal match cannot be made. If the match is not an exact match, a maximal match, or a partial match with a difference in a property value having a mathematically mappable function, the match is considered a minimal match, and the outgoing slide is cross-faded into the incoming slide (block 358) as the transitional animation (e.g., transitional animation 4 164).

If the match type is a partial match with a difference in a property value having a known mappable function, the process 350 continues to determine a number of intermediate frames to be inserted between the outgoing slide and the incoming slide (block 360). In some embodiments, the number of intermediate frames may be determined using a user input received via the input structures 14, a predetermined number for all transitions, a predetermined number based on a class of transition types, a number based on a predetermined ratio (e.g., ½) of the frame rate of a presentation, a run time or duration of an animation transition from the outgoing slide to the incoming slide, or some other suitable method of determining the number of intermediate frames. Once the number of frames has been determined, one or more frames are created between the outgoing slide and the incoming slide (block 362). In some embodiments, the intermediate frames may not appear in the slide organizer 40 but are rather stored in an off-screen buffer. In such embodiments, the intermediate frames may be used solely during presentations or previews of presentations using the presentation application.

Furthermore, in certain embodiments, the intermediate frames are created at a time of creation of the slide presentation. In other embodiments, the intermediate frames are created at a time of presentation/preview of the slide presentation. Moreover, all intermediate frames may be created at one time or may be created in smaller groups until the number of intermediate frames is achieved. In other words, although the processor(s) 12 has previously determined a number of frames to be created, the processor(s) 12 may create smaller numbers of intermediate frames (e.g., one or more) at a time using the determined number to control the amount of change of the property across each intermediate frame.

Each of the intermediate frames is populated with one or more intermediate objects (block 364). The intermediate frames may also be populated with exact match objects or maximal match objects that remain visible throughout a transition. In successive intermediate frames, intermediate objects incrementally apply a change to an object in the outgoing slide to transform the object to a matched object in the incoming slide. The amount of change applied varies according to the known mappable function. In some embodiments, the function may be linear or non-linear. Each intermediate frame may have multiple intermediate objects each applying different property changes. Each of the intermediate objects in a single intermediate frame may be created using a different function since the function is dependent upon the type of property being transitioned. In some embodiments, the slide presentation may be displayed with the intermediate frames providing a smoother transition from the outgoing slide and the incoming slide (block 366). In other words, the outgoing slide may be morphed into the incoming slide using a temporal filter that spreads the morphing out over the duration of the animation morphing based on a known mappable function for the properties being morphed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor-implemented method for transitioning between slides in a slide presentation, comprising:
   determining whether a first object in a first slide in the slide presentation differs from matching a second object in a second slide in the presentation in one or more properties between the first object and the second object; and
   creating one or more intermediate objects that incrementally reflect changes from the first object to the second object, wherein the one or more intermediate objects are configured to smooth the transition from the first object to the second object;
   determining a number of intermediate frames, wherein each intermediate frame comprises at least one of the one or more intermediate objects corresponding to the first and second objects;
   displaying one change of a set of changes from the first object to the second object applied in each of the number of intermediate frames with respect to the one or more properties, wherein each change of the set of changes is determined by:
      determining a difference between a first property value with a first property in the second slide and a second property value of the first property in the first slide; and dividing the difference by the number of intermediate frames.

2. The processor-implemented method of claim 1, wherein the one or more properties comprise line thickness, line color, opacity, fill color, shadow information, or a combination thereof.

3. The processor-implemented method of claim 1, wherein determining the number of intermediate frames comprises receiving a selection of a number of intermediate frames.

4. The processor-implemented method of claim 1, wherein determining the number of intermediate frames comprises using a predetermined number of frames.

5. The processor-implemented method of claim 4, wherein the predetermined number of frames corresponds to a transition function.

6. The processor-implemented method of claim 1, wherein determining the number of intermediate frames comprises using a ratio multiplied by a framerate of a presentation application executing the slide presentation to determine the number of intermediate frames.

7. The processor-implemented method of claim 1, wherein the one or more properties have one or more corresponding known mappable transition functions other than translation, rotation, or scaling transitions used in creating the one or more intermediate objects.

8. A non-transitory computer readable medium having stored thereon instructions, which when executed by one or more processors cause acts to be performed comprising:
    determining whether an outgoing value for a property of an outgoing object in an outgoing slide in a slide presentation differs from a corresponding incoming value for the property of an incoming object in an incoming slide in the slide presentation; and
    morphing the outgoing object into the incoming object using an animation comprising one or more intermediate objects configured to be sequentially displayed on a display, wherein morphing the outgoing object into the incoming object comprises temporally filtering the morphing across a duration of the animation to cause an appearance of smoothing the morphing during the animation at least partially by:
        determining a number of intermediate frames, wherein each intermediate frame comprises at least one of the one or more intermediate objects corresponding to the outgoing object and the incoming object, wherein morphing the outgoing object;
        displaying one change of a set of changes from the outgoing value to the incoming value applied in each of the number of intermediate frames, wherein each change of the set of changes is determined by:
        determining a difference between a first property value of a first property in the incoming slide and a second property value of the first property in the outgoing slide; and
        dividing the difference by the number of intermediate frames.

9. The non-transitory, computer-readable medium of claim 8, wherein the property comprises line thickness, line color, opacity, fill color, shadow information, or a combination thereof.

10. The non-transitory, computer readable medium of claim 8, wherein the instructions, when executed by the one or more processors cause further acts to be performed comprising determining the morphing based at least in part on a number of intermediate frames, a frame rate, or a length of the duration of the animation.

11. The non-transitory computer readable medium of claim 8, wherein the instructions, when executed by the one or more processors cause further acts to be performed comprising displaying the one or more intermediate objects between the outgoing object and the incoming object in a presentation or a preview of the slide presentation.

12. The non-transitory computer readable medium of claim 8, wherein the property corresponds to a non-geometric known mappable function.

13. A system, comprising:
    one or more processors; and
    a memory comprising a non-transitory, computer-readable medium having stored thereon instructions when executed by the one or more processors are configured to cause the processor to:
        determine whether differences exist between one or more first property values of a first object in a first slide of a slide presentation and one or more corresponding second property values of matching a second object in a second slide of the slide presentation; and
        create one or more intermediate frames each having an intermediate object that incrementally applies a change corresponding to the differences, wherein the change applied in each of the one or more intermediate frames is determined by:
        determining a difference between a first property value of the second object in the second slide and a second property value of the first object in the first slide; and
        dividing the difference by the number of intermediate frames.

14. The system of claim 5, wherein the property type comprise line thickness, line color, opacity, fill color, shadow information, or a combination thereof.

15. The system of claim 13, wherein transition functions is used in the change represented by the intermediate object in each intermediate frame.

16. The system of claim 15, wherein the first property is relatable to the second property via a transition function.

17. A processor-implemented method for transitioning between slides in a slide presentation, comprising:
    generating an animation between an outgoing object and incoming object when a partial match has been determined between the outgoing and incoming objects, wherein generating the animation includes creating one or more intermediate frames between the outgoing object and the incoming object, wherein each of the one or more intermediate frames in the animation comprises at least one of one or more intermediate objects corresponding to the outgoing object and the incoming object and changes at least one property of the at least one of the one or more intermediate objects that differs in value between the outgoing object and the incoming object, wherein the changes from the outgoing object to the incoming object applied in each of the one or more intermediate frames is determined by:
    determining a difference between a first property value of a first property in the incoming slide and a second property value of the first property in the outgoing slide; and
    dividing the difference by the number of intermediate frames.

18. The processor-implemented method of claim 17, wherein the at least one property comprises line thickness, line color, opacity, fill color, shadow information, or a combination thereof.

19. The processor-implemented method of claim 17, wherein an amount of change between intermediate frames is based at least in part on a frame rate or a length of the animation.

20. The processor-implemented method of claim 11, wherein the at least one property corresponds to at least one known mappable function.

21. A processor-implemented method for transitioning between slides in a slide presentation, comprising:
- using one or more processors to determine a match type between an outgoing object in an outgoing slide in a slide presentation and an incoming object in an incoming slide in the slide presentation as one of the following match types:
  - a maximal match when the outgoing object and the incoming object differ only in a geometric transformation,
  - a minimal match when the outgoing object and the incoming object differ in a non-geometric transformation, and
  - a partial match when the outgoing object and the incoming object differ in a non-geometric transformation; and
- if the match type is a partial match, using the one or more processors to create a plurality of intermediate objects each reflecting an incremental change to the outgoing object morphing into the incoming object; and
- if the match type is a partial match, determining a number of intermediate frames, wherein each intermediate frame comprises at least one of the plurality of intermediate objects, wherein the incremental change from the outgoing object morphing into the incoming object reflected in each of the plurality of intermediate frames is determined by:
  - determining a difference between a first property value of a first property in the incoming slide and a second property value of the first property in the outgoing slide; and
  - dividing the difference by the number of intermediate frames.

22. The processor-implemented method of claim 21, comprising, if the match type is a minimal match, cross-fade the outgoing object into the incoming object during a transition from the outgoing slide to the incoming slide.

23. The processor-implemented method of claim 21, wherein the plurality of intermediate objects are configured to cause an appearance of smoothness during a transition from the outgoing object to the incoming object on a display during the slide presentation.

24. The processor-implemented method of claim 21, wherein in the case of a partial match, the non-geometric transformation is defined by a corresponding known mappable function.

* * * * *

UNITED STATES PATENT AND TRADEMARK OFFICE
CERTIFICATE OF CORRECTION

PATENT NO. : 9,965,885 B2  
APPLICATION NO. : 14/057887  
DATED : May 8, 2018  
INVENTOR(S) : Mark J. Flider Page 1 of 1

It is certified that error appears in the above-identified patent and that said Letters Patent is hereby corrected as shown below:

In the Claims

Column 21, Lines 46 and 47 (Claim 8) - remove ", wherein morphing the outgoing object".

Column 22, Line 32 (Claim 14) - replace "5" with --13--.

Column 22, Line 38 (Claim 16) - replace "15" with --13--.

Signed and Sealed this  
Eleventh Day of December, 2018

Andrei Iancu  
*Director of the United States Patent and Trademark Office*